Aug. 18, 1970     A. BRAUN     3,525,102
ENGINE

Original Filed Sept. 12, 1967     5 Sheets-Sheet 1

INVENTOR.
ANTON BRAUN
BY
John J. Held, Jr.
ATTORNEY

Aug. 18, 1970

A. BRAUN 3,525,102

ENGINE

Original Filed Sept. 12, 1967

INVENTOR.
ANTON BRAUN
BY John J. Held, Jr.
ATTORNEY

INVENTOR.
ANTON BRAUN
BY John J. Held, Jr.
ATTORNEY

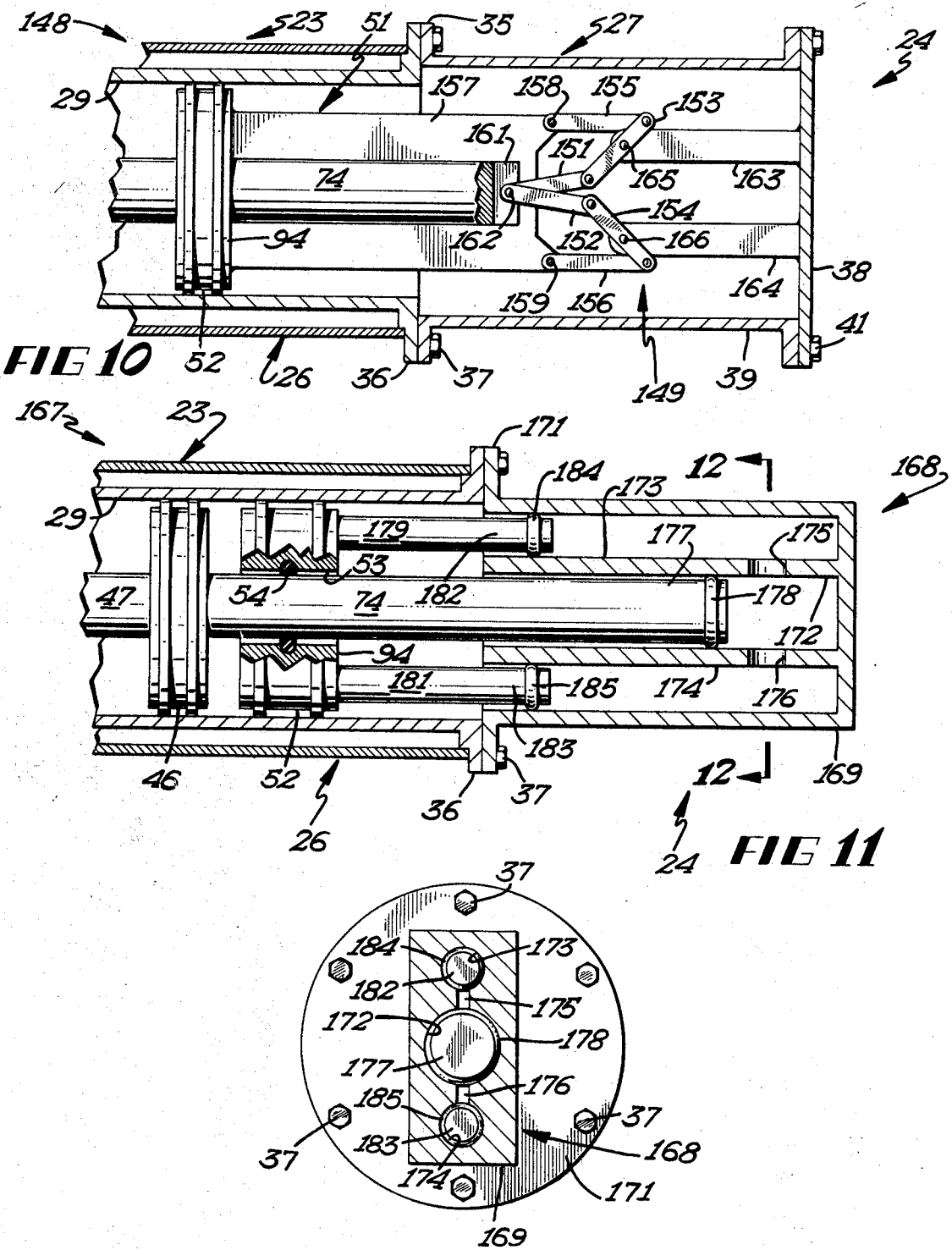

INVENTOR.
ANTON BRAUN
BY
John J. Held, Jr.
ATTORNEY

United States Patent Office 3,525,102
Patented Aug. 18, 1970

3,525,102
ENGINE
Anton Braun, 6421 Warren Ave., Edina, Minn. 55435
Continuation of application Ser. No. 728,078, May 9, 1968, which is a continuation of Ser. No. 669,353, Sept. 12, 1967, which in turn is a continuation-in-part of application Ser. No. 619,374, Feb, 28, 1967, which in turn is a continuation-in-part of application Ser. No. 584,710, Oct. 6, 1966. This application Dec. 17, 1968, Ser. No. 805,063
Int. Cl. F02b 71/00; F16h 21/44; F04b 31/00
U.S. Cl. 417—364                                                 37 Claims

ABSTRACT OF THE DISCLOSURE

A lightweight and compact free piston engine which includes a combined power-compressor piston assembly and a compressor piston that are mounted for reciprocal movement in a cylinder formed in the engine housing. The engine has a combustion chamber at one end of the cylinder and a compressor chamber in the cylinder between the piston assembly and the piston. The movement of the piston assembly and the piston in the cylinder is synchronized by a synchronizer and various mechanical and hydraulic synchronizers are disclosed.

In one embodiment, a counter-balancing, movable weight is utilized instead of the compressor piston. In this engine, balance is achieved by translational movement, with respect to the housing, of the weight oppositely to that of the combined power-compressor piston assembly.

CROSS REFERENCES

This is a continuation of application Ser. No. 728,078, filed May 9, 1968, now abandoned, which was a continuation of application Ser. No. 669,353, filed Sept. 12, 1967, now abandoned, which was a continuation-in-part of application Ser. No. 619,374, filed Feb. 28, 1967, now abandoned, which was a continuation-in-part of application Ser. No. 584,710, filed Oct. 6, 1966, now abandoned. The subject matter relating to the synchronization apparatus disclosed herein and disclosed and claimed in these four above-identified applications is now disclosed and claimed in a divisional application, Ser. No. 829,329, filed June 2, 1969, by Anton Braun.

Multi-cylinder free piston engines are disclosed and the engines of this invention may include novel scavenge air, bouncer chamber and compressor chamber arrangements which can be utilized to improve the efficiency of the engines.

BACKGROUND

This invention relates to an improved free piston engine.

Generally, free piston engines have included a pair of opposed, axially aligned pistons which may reciprocate within a cylinder, and which are designed and arranged in the cylinder so as to define a combustion chamber between the pistons and a compression chamber at each end of the cylinder.

One of the primary advantages of free piston engines is that theoretically, the weight and over-all size of these engines may be reduced, as compared to the weight and size of a conventional crank type engine of the same class or same power output operating at the same piston speeds. This reduction of weight and size is possible because many of the forces and force moments developed in conventional crank type engines in transforming the reciprocating forces of the pistons into useful output work do not have to be present in free piston engines, due to their design.

However, in spite of its theoretical size and weight advantage, the successful commercial exploitation of free piston engines has been hindered by a number of problems. One such problem was for one reason or another the prior, commercially available free piston engines, and particularly free piston engine-compressors, have not been appreciably lighter or more compact than comparable crank type engine-compressors. The arrangement of the synchronizers that have been heretofore used have limited the extent to which weight and size could be reduced.

In the past, the synchronizer for free piston engines was usually positioned adjacent the cylinder and next to the central combustion chamber. Moreover, in the free piston engines utilizing the so-called "stepped" pistons, the synchronizer has been frequently positioned in the annular volume defined by the outer diameters of the larger compressor portions and the smaller combustion portions of the stepped pistons.

While locating the synchronizer in the annular volume, or at least adjacent the side of the engine, would appear to provide the most compact and otherwise advantageous arrangement, experience showed that when the synchronizer was so positioned, it was difficult to design satisfactory intake and exhaust ducting for the central combustion chamber of the engine. Thus, in practice, significant design restrictions were imposed on both the design of the synchronizer and the design of the ducting. Moreover, when the synchronizer is positioned adjacent the side of the cylinder, the overall width and/or height of the engine will be increased beyond that otherwise necessary for the cylinder and the other component parts of the engine.

The problem of the arrangement of free piston engine synchronizers is further complicated by the fact that in recent years, the efficiency of free piston engines, and particularly free piston gasifiers, has been improved by increasing the compression ratio in the compressor section of the engine. As a result, the larger diameter portions of the stepped pistons have been reduced, relative to the outer diameter of the combustion portion of the stepped piston, and this correspondingly reduces the annular volume in which the synchronizer and the intake and exhaust ducting may be positioned.

To overcome this problem, one prior free piston engine included a synchronizer which was positioned radially outwardly from the outer diameter of the compressor portion of the engine, and which was connected to the piston assemblies by means of rods that projected from the ends of the engine. However, this engine is larger and heavier than prior free piston engines of the same class.

In other free piston engines, this problem has at least been partially overcome by utilizing unsymmetrical synchronizer linkage in the annular volume, i.e. positioning the synchronizer linkage only on one side of the engine, rather than symmetrically on both sides of the engine. While this arrangement permits more of the annular volume to be used for intake and exhaust ducting, it is extremely difficult, as a practical matter, to use unsymmetrical synchronizers in engines in which the synchronizer is required to transmit any appreciable forces from one piston assembly to the other.

SUMMARY

Briefly, the novel and improved fress piston engine of the present invention overcomes the above mentioned problems while achieving a significant reduction in the weight and the overall size of the engine. One embodiment of an improved engine of this invention includes a housing having coaxial power and compressor cylinders formed therein. A power piston is positioned in the power cylinder for reciprocal movement therein, and a pair of compressor pistons are positioned in the compressor cylinder for reciprocal movement therein, with the power piston and the adjacent compressor piston being interconnected so that these pistons move together as a unit. A combustion chamber is formed in the power cylinder between the outer face of the power piston and the closed outer end of power cylinder, and a compressor chamber is formed in the compressor cylinder between the inner faces of the compressor pistons. The movement of the pistons in the cylinders is controlled by synchronization apparatus. In another embodiment, a translationally movable, counter-balancing weight is utilized in place of the compressor piston, and the synchronization apparatus is arranged so that the counter-balancing weight moves oppositely with respect to the interconnected power and compressor pistons thereby to balance the engine.

Most of the components of the engine are readily available standard types of elements and this aids in achieving public acceptance of the engine as well as reducing the cost of the engine. Also, the design and construction of the engine are such that the engine is capable of providing relatively long-lasting, reliable service with a minimum of maintenance.

Accordingly, it is one of the primary objects of the present invention to provide an improved free piston engine which is significantly lighter than the prior, commercially available free piston engines and conventional crank type internal combustion engines of the same class and which utilizes means to synchronize the movement of the pistons.

Another object of the present invention is to provide a practical, commercially acceptable free piston engine capable of sustained, high performance service wherein the cylinder walls of the engine comprise the primary structural support members or frame of the engine so as to minimize the weight and over-all size of the engine by reducing the structure of the engine as close as possible to its thermodynamically necessary elements. A related object of the present invention is to provide an improved free piston engine which is relatively inexpensive to manufacture and provides relatively trouble-free service with a minimum of maintenance and which may be quickly and easily assembled or disassembled.

Another object of the present invention is to provide an improved free piston engine which includes an interconnected power piston and compressor piston where the movement of the interconnected pistons in one direction is balanced by the oppositely directed, translational movement, with respect to the engine housing, of a counter-balancing movable weight.

Another object of the present invention is to provide an improved free piston engine which includes a power piston and a pair of compressor pistons, with two of the pistons being interconnected so as to move together as a unit and with one of the pistons remaining which is not associated with the group, which includes a combustion chamber within the engine and at least one compressor chamber formed adjacent a compressor piston, and which includes means for synchronizing the movement of the piston group and the remaining piston, with the synchronizing means including means that may penetrate one or more of the pistons within the engine.

Another object of the present invention is to provide an improved free piston engine which comprises a plurality of engine cylinders, each engine cylinder having a pair of axially opposed pistons positioned for reciprocal movement therein, wherein a synchronizer synchronizes the movements of all the pistons in the engine.

Still another object of the present invention is to provide an improved free piston engine which may include wall means positioned between the opposed pistons in the compressor section of the engine for improving the volumetric efficiency of the compressor section and permitting the compressor section to be designed substantially independently of the design of the rest of the engine. A related object of the present invention is to provide an improved free piston engine having various novel means for scavenging the combustion section of the engine and for providing bouncer chambers.

These and other objects and advantages of the present invention will become apparent from the following description of the preferred embodiments of this invention, described in connection with the accompanying drawings.

DESCRIPTION OF THE DRAWINGS

FIG. 10 is a vertical cross-sectional view of another mechanical synchronizer which may be utilized with the engines of the present invention;

FIG. 11 is a vertical cross-sectional view of a hydraulic synchronizer which may be utilized with the engines of the present invention;

FIG. 12 is a cross-sectional view taken along the section line 12—12 in FIG. 11;

Throughout the various figures of the drawings, the same numerals will be used to designate the same parts in the various engines. Moreover, when the terms "right," "left," "right end" and "left end" are used herein, it is

DESCRIPTION OF THE PREFERRED EMBODIMENTS—FIGS. 1-4

Figure 1:
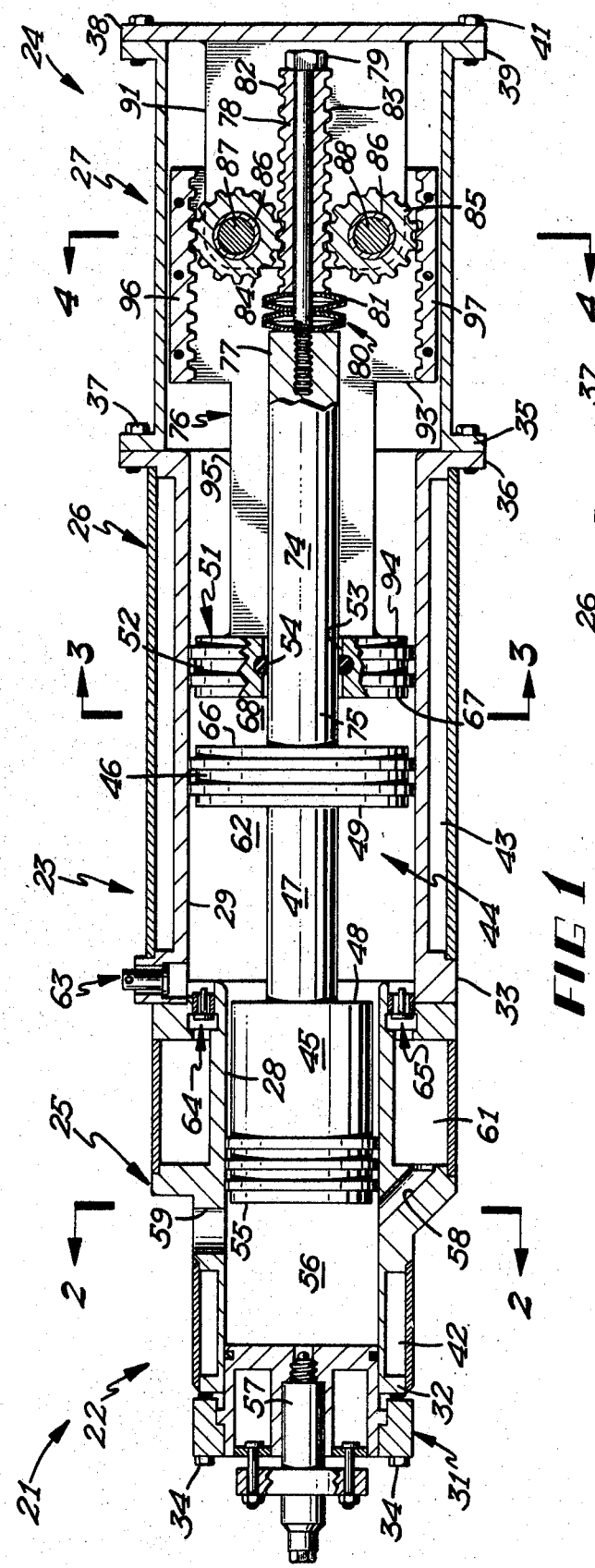
FIG. 1 is a vertical cross-sectional view of an embodiment of the improved free piston engine of the present invention, taken along the central longitudinal axis of the engine, with some parts of the engine being shown broken away and others shown in elevation and with the piston assemblies being shown at one end of their strokes.

One embodiment of the free piston engine of the present invention is shown at 21 in FIG. 1. The engine 21 includes three basic functional components, that is, a combustion component, shown generally at 22, a compressor component, shown generally at 23, and a synchronizer component, shown generally at 24.

More specifically, the engine 21 comprises an end, cylindrical housing 25, a central, cylindrical housing 26 and a generally rectangular, in cross-section, synchronizer housing 27. The housings 25 and 26 have central coaxial bores 28 and 29 respectively formed therein which extend completely through the housings. In the engine shown in FIG. 1, the diameter of bore 28 is smaller than the diameter of bore 29.

A cylinder head 31 closes and slightly fits within the left end 32 of bore 28. The cylinder head 31 and the end housing 25 are both fastened to the left flanged end 33 of the center housing 26 by a plurality of threaded bolts or tie-rods 34.

The left flanged end 35 of the synchronizer housing 27 is fastened to the right flanged end 36 of the central housing 26 by bolts 37. A cover plate 38 closes the open right end 39 of the synchronizer housing 27 and is fastened to the end 39 by bolts 41.

Thus, in view of the above structure it is apparent that the engine 21 may be completely disassembled by the simplest expedient of removing bolts 34, 37 and 41.

To permit cooling of the engine, generally annular cooling chambers or cavities 42 and 43 are formed in the housings 25 and 26, respectively, through which coolants may be circulated. Since conventional coolant circulating systems may be utilized with the engine 21, further details of the engine coolant system are not shown in the drawings or described herein.

A piston assembly, shown generally at 44, is positioned, for reciprocal movement, in bores 28 and 29. The piston assembly 44 includes a piston 45 which is positioned in bore 28 and a piston 46 which is positioned in bore 29. The pistons 45 and 46 may be of conventional design and construction and may include piston rings to prevent gases from leaking between the pistons and their respective bores during reciprocal movement of the pistons. A rod 47, extending from the inner face 48 of the piston 45 to the outer face 49 of the piston 46, interconnects the pistons 45 and 46 so that the pistons move together in the engine as a unit.

A second piston assembly 51 is positioned for reciprocal movement in bore 29 and includes a piston 52 which is generally similar in construction and diameter to piston 46. However, for reasons hereinafter explained, piston 52 has an axial aperture 53 formed therein. A conventional sealing ring 54 is carried in a groove formed about the periphery of the aperture 53.

The outer face 55 of the piston 45 and cylinder head 31, together with the bore 28, define an internal combustion chamber 56. In engine 21, a combustion of a fuel-air mixture in the chamber 56 results from the compression of the air or the fuel-air mixture between the outer face 55 of piston 45 and the cylinder head 31, in accordance with the principles of operation of conventional internal combustion engines. In the case of a diesel engine, a conventional fuel injector unit 57 is carried by the cylinder head 31 and communicates with the chamber 56. Of course, combustion of the fuel-air mixture in chamber 56 may also be accomplished by the use of a conventional spark plug and accompanying conventional ignition system.

Figure 2:
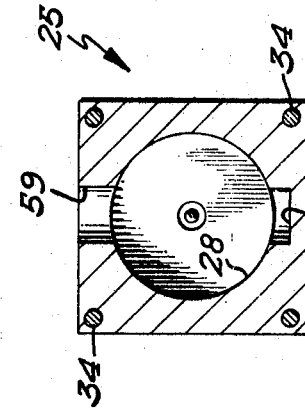
FIG. 2 is a cross-sectional view of the engine taken along the section line 2—2 in FIG. 1.

Referring to FIGS. 1 and 2, air under pressure is introduced into the chamber 56 through one or more intake ports, one being shown at 58 and the hot combustion gases are exhausted from the chamber 56 through an exhaust port 59. The ports 58 and 59 are arranged, relative to the chamber 56, so that the chamber 56 will be "loop-scavenged" during normal operation of the engine 21. The flow through the ports 58 and 59 is controlled by the piston 45.

A generally annular scavenge air chamber 61 is formed in the housing 25 and the intake port 58 communicates with the chamber 61 so that when the piston 45 is not blocking the port 58, air from chamber 61 flows through port 58 and into chamber 56, as more fully explained hereinafter.

A second air chamber 62 is defined by the inner face 48 of piston 45 and the outer face 49 of the piston 46 together with bore 29. Air is drawn into chamber 62 through a conventional one-way valve, shown schematically at 63, mounted in the housing 26 while the piston 46 moves to the right in bore 29. The air in chamber 62 is forced into chamber 61 by the piston 46 through conventional one-way valves, shown schematically at 64 and 65, when the piston assembly 44 moves to the left from the position shown in FIG. 1. In view of the difference in the diameters of bores 28 and 29, air is introduced into chamber 61 from chamber 62 under pressure. Moreover, the volumes of chambers 61 and 62 and the dimensions of ports 58 and 59 are selected so that the pressure of the air in chamber 61 and port 58 is greater than the pressure of the gases in chamber 56 when the piston 45 is not blocking port 58.

Figure 3:
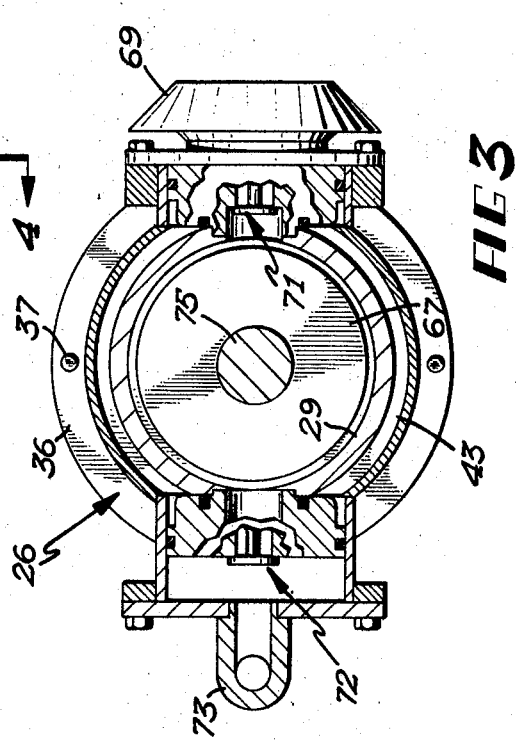
FIG. 3 is a cross-sectional view of the engine taken along the section line 3—3 in FIG. 1.

Referring now to compressor component 23 of the engine 21, the inner faces 66 and 67 of the pistons 46 and 52, respectively, together with the bore 29, define a compressor chamber 68 between the pistons 46 and 52. As shown in FIG. 3, air is drawn into the compressor chamber 68 through a conventional air filter 69 and one-way valve, shown schematically at 71, as the pistons 46 and 52 move away from each other in the bore 29. As the pistons 46 and 52 move toward each other in bore 29, air in the compressor chamber 68 is compressed to a predetermined pressure and is expelled, under pressure, from the compressor chamber through a conventional one-way valve, shown schematically at 72, and manifold 73.

The synchronizer component 24 of the engine 21 is generally positioned at the right end of the engine and as more fully explained hereinafter, is designed to transmit the instantaneous differential forces acting on the piston assemblies from one piston assembly to the other with a minimum loss of energy, due to friction, in the transmission of these forces.

More specifically, the synchronizer component 24 includes a shaft 74 which is secured at one end 75 to the inner face 66 of piston 46 and which penetrates or projects into and through the aperture 53 formed in the piston 52. The outer diameter of the shaft 74 is selected so as to prevent leakage of air between the shaft and the piston 52 while minimizing friction therebetween, during relative movement between the shaft and the piston 52. Furthermore, to avoid creation of side forces, the central longitudinal axes of the bores 28 and 29, the piston assemblies 44 and 51 and the shaft 74 are coaxial.

A synchronizer mechanism 76 is connected to the projecting end 77 of the shaft 74. The mechanism 76 includes a double-rack block 78 which is mounted on the projecting end 77 of the shaft 74 by means of a threaded pin 79 that extends through a central bore in block 78 and is threaded into the end 77 of the shaft. A shock absorbing assembly 80 is carried by the pin 79 between the block 78 and the end 77. The assembly 80 includes several sets of conventional springs 81 arranged in back-to-back, nesting contact such as, for example, "Belleville" type springs. The shock absorbing assembly 80 permits limited movement of the block 78 along the pin 79, relative to the end 77 of shaft. The purpose of this relative movement is to permit the absorption of any shocks or excessive forces imposed on the synchronizer mechanism 76, for instance, during engine start up.

Figure 4:
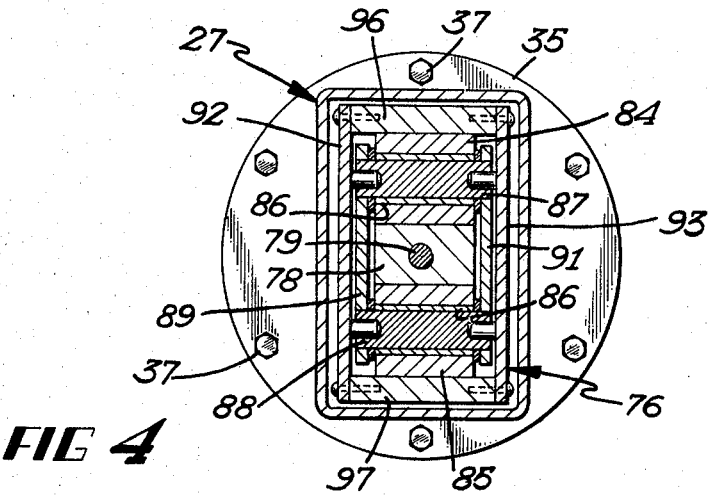
FIG. 4 is a cross-sectional view of the synchronizer taken along the section line 4—4 in FIG. 1.
Figure 5:
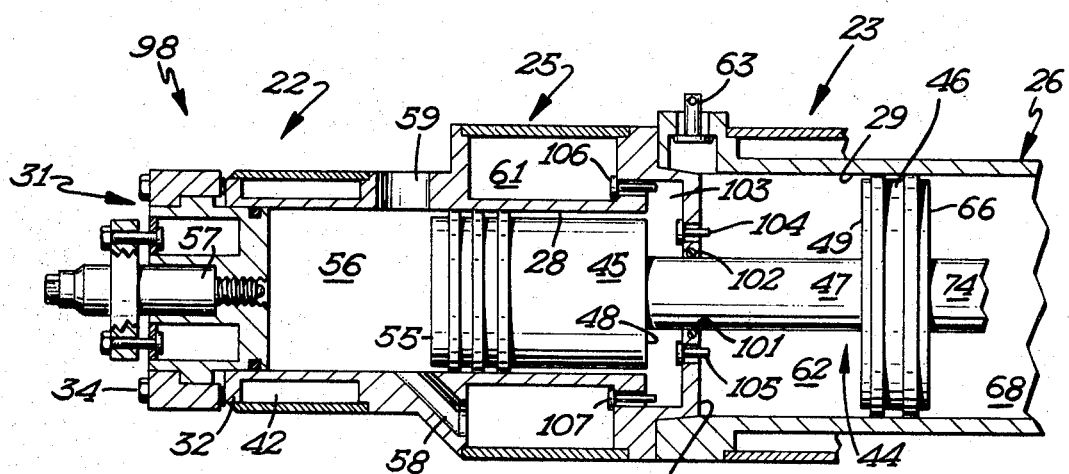
FIG. 5 is a vertical cross-sectional view of the combustion end of another embodiment of the engine of the present invention, taken along the central longitudinal axis of the engine and showing another arrangement for scavenging the combustion chamber of the engine.
Figure 6:
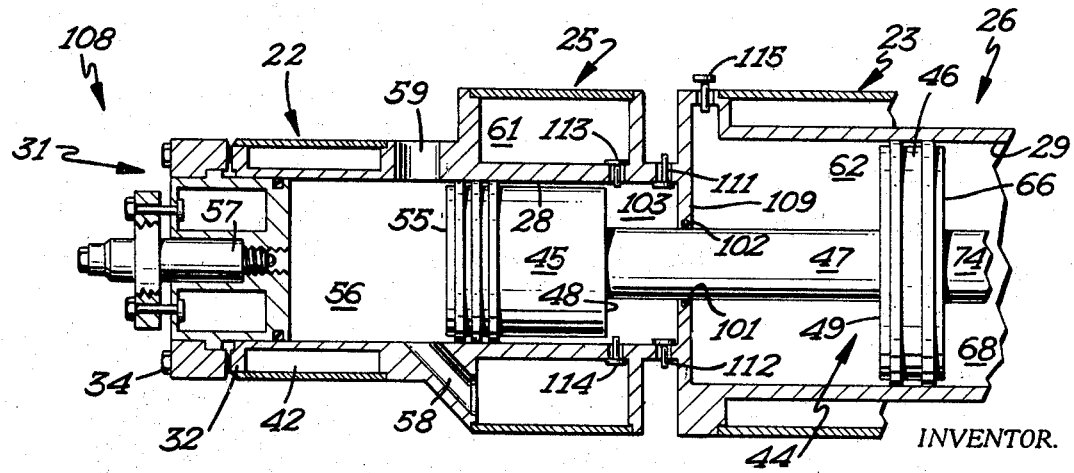
FIG. 6 is a vertical cross-sectional view of the combustion end of a futrher embodiment of the engine of the present invention, taken along the central longitudinal axis of the engine and showing still another arrangement for scavenging the combustion chamber of the engine.
Figure 7:
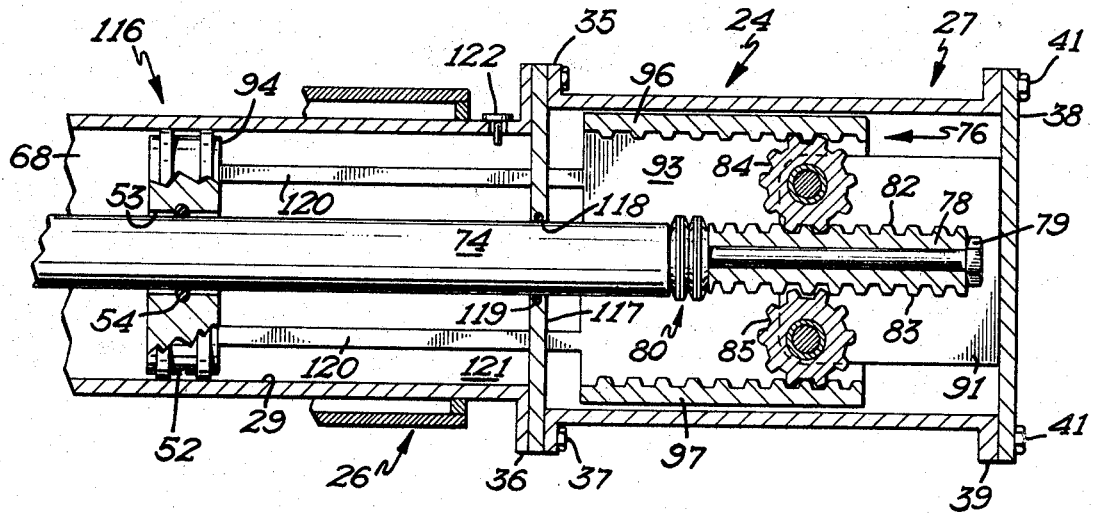
FIG. 7 is a cross-sectional view of the synchronizer and of a further embodiment of the engine of the present invention, taken along the central longitudinal axis of the engine, wherein a bouncer chamber is formed between the compressor section of the engine and the synchronizer.

Referring now to FIGS. 1 and 4, racks 82 and 83 are formed on the upper and lower surfaces of the block 78, respectively, so that the teeth of the racks 82 and 83 project from the block 78 in opposite directions, that is, substantially radially outwardly from the central longitudinal axis of the pin 79 and thus, of the shaft 74. The racks 82 and 83 may be of conventional design and the teeth thereof may have a conventional profile.

A pair of pinions 84 and 85 are positioned adjacent the block 78 so that the teeth of the pinions 84 and 85 engage the teeth of the racks 82 and 83, respectively. The teeth of the pinions are of meshing design and profile to the teeth of racks 82 and 83. Pinions 84 and 85 are mounted on bushings 86 for rotation about horizontally disposed shafts 87 and 88, respectively. The ends of the shafts 87 and 88 are carried by a pair of parallel, vertically arranged brackets 89 and 91 which are secured to the plate 38.

A pair of movable wall members 92 and 93 are positioned adjacent to and parallel with the brackets 89 and 91, respectively. However, there is no sliding contact between the wall members and the brackets. The wall members are connected with the outer face 94 of the piston 52 by means of integral extensions, one of which is shown at 95, of the wall members whereby the wall members 92 and 93 and the piston 52 move together as a unit.

A second pair of racks 96 and 97 are carried by and positioned between the upper and lower ends of the wall members 92 and 93, as shown in FIGS. 1 and 4. The teeth of the racks 96 and 97 are of meshing design and profile to the teeth of the pinions 84 and 85. The racks 96 and 97 are positioned between wall members 92 and 93 so that the teeth of the racks 96 and 97 engage the teeth of the pinions 84 and 85, respectively, whereby movement of the piston 52 and thus the racks 96 and 97 in one direction causes rotational movement of the pinions 84 and 85. This rotational movement of the pinions, in turn, moves the double-rack block 78, and thus the shaft 74, and the piston assembly 44, in the opposite direction. In other words, the racks 82, 83, 96 and 97 and pinions 84 and 85 are arranged such that when the racks 96 and 97 are moved in one direction, the racks 82 and 83 are moved in the opposite direction and vice versa.

As noted above, the synchronizer mechanism 76 is capable of transmitting relatively large instantaneous differential forces acting on the piston assemblies 44 and 51 from one assembly to the other, with minimal losses due to friction. This minimal frictional loss in the synchronizer mechanism is due to the arrangement of the mechanism 76, and more particularly, to the arrangement of the racks 82, 83, 96 and 97 and the pinions 84 and 85 which eliminates sliding contact between the movable racks and fixed bearing surfaces and thus eliminates a major cause of fractional losses in the synchronizers as heretofore utilized with free piston engines. In other words, the arrangement of the mechanism 76 completely cancels the effect of the normal component of the forces created by the engagement between the teeth of the racks and the pinions. Furthermore, frictional losses in the mechanism 76 are further reduced since the double-rack block 78 and racks 96 and 97 are self-aligning in that they inherently seek a position relative to the pinions 84 and 85 in which the forces created by the meshing of the teeth of the pinions and the racks 82 and 84 and also the racks 96 and 97 are minimized.

OPERATION—FIGS. 1–4

The operation of the engine 21 may be summarized as follows: In FIG. 1, the piston assemblies 44 and 51 are shown at their innermost position. Even though air is expelled from the compressor chamber 68 through the valve 72, the energy in the compressed air remaining in chamber 68 is sufficient to stop the inward movement of the pistons 46 and 52 and subsequently to force these pistons to move apart again, so that the inner faces 66 and 67 of the pistons 46 and 52 are prevented from contacting each other. As noted above, because of the synchronizer mechanism 76, the movement of piston 46 is the mirror image of the movement of piston 52. As the pistons 46 and 52 move translationally outwardly in bore 29 from the position shown in FIG. 1, the piston 45 is also translationally moved toward the left in bore 28. As piston 45 moves in the bore 28, it blocks ports 58 and 59 and compresses the air or fuel-air mixture in chamber 56. The compression of the air or fuel-air mixture in chamber 56 continues until the piston 45 reaches the outer end of its stroke. Combustion in chamber 56 forces the piston 45 and thus the piston 46 to translationally move toward the right in bores 28 and 29, respectively. Again, because of mechanism 76, the piston 52 is forced to translationally move to the left in bore 29. The pistons 46 and 52 move inwardly toward each other until they again assume the position shown in FIG. 1. Thereafter the above cycle of operation is again repeated.

As previously noted, during the leftward movement of the piston 46 air is forced from chamber 62 into the scavenge air chamber 61 through valves 64 and 65. The pressure of the air in chamber 61 is increased so that when the piston 45 again uncovers first the port 59 and then port 58, that is, after combustion in chamber 56, the air in chamber 61 scavenges the chamber 56. Moreover, when the piston 46 is moved to the right, atmospheric air is drawn into the chamber 62 through valve 63.

Also during the above cycle of operation, atmospheric air is drawn into the compressor chamber 68 through valve 71, compressed therein and expelled from the compressor chamber through the valve 72. Of course, the compressed air expelled from compressor chamber 68 may be utilized in any manner.

As noted above, one of the advantages of the improved free piston engine of this invention is that substantially vibrationless operation may be easily achieved. However, vibrationless operation is only possible if the sum of the product of the mass of the piston assembly 44, the shaft 74 and the block 78 times the distance through which these elements move plus the product of the mass of the piston assembly 51, wall members 92 and 93 and racks 96 and 97, times the distance through which these elements move is equal to zero. In other words, the mass of the elements translationally moving in one direction with respect to the engine housing times the length of their stroke must be equal to the mass of the elements translationally moving in the opposite direction with respect to the engine housing times the length of their corresponding stroke. In the most common case, the masses of the two oppositely moving elements will be equal and the lengths of their strokes will be equal, but, of course, this is not necessary.

Lastly, it should be noted that an engine, such as shown in FIGS. 1–4, has been constructed and has been operated, on an experimental basis. This engine has an over-all length of 35 inches as measured between the members corresponding to cylinder head 31 and plate 38 and has a maximum width of 8 inches and maximum height of 10 inches, as measured in the cross-section shown in FIG. 3. The over-all weight of the engine is approximately 160 pounds, not including the test instrumentation presently mounted on the engine. The output of the compressor component of the engine has been measured at approximately 80 c.f.m. with the engine running at less than 1800 cycles per minute.

ALTERNATIVE ENGINE SCAVENGING ARRANGEMENT—FIG. 5

Engine 98 is identical, in structure and mode of operation, to the engine 21 except that another scavenging arrangement has been provided. This other scavenging arrangement may be utilized to improve the efficiency of the engine by reducing the amount of scavenge work which the pistons 45 and 46 must do during the time they move to the right and left, respectively.

In engine 21, after the piston 45 blocks the port 58, the piston 46 must work against the pressure being built up in chambers 61 and 62 as the piston assembly 44 continues to move toward the left. This work tends to reduce the efficiency of the engine 21 to the degree that the pressure in chamber 61 has to be built up above the theoretical minimum pressure required for scavenging.

To improve efficiency, the housing 25 of the engine 98 includes a wall 99 which extends between and blocks communication between the bores 28 and 29. The wall 99 has a central aperture 101 formed therein through which the rod 47 projects. A sealing ring 102 prevents leakage of air between the rod 47 and the aperture 101 during relative movement between the shaft and the wall 99.

The wall 99 and the inner face 48 of the piston 45, together with the bore 28, define a chamber 103. One way valves, as shown schematically at 104 and 105, are mounted in wall 99 and permit air to flow from chamber 62 into chamber 103. One way valves, shown schematically at 106 and 107, are mounted in housing 25 and permit air to flow from chamber 103 to chamber 61. As in engine 21, atmospheric air is drawn into chamber 62 through one-way valve 63.

The operation of this scavenging arrangement is as follows: As the piston assembly 44 moves to the right, air is drawn into chamber 62 through one-way valve 63 as in engine 21. However, as piston assembly 44 and more particularly, piston 46 moves to the left, the air in chamber 62 is forced into chamber 103 through valves 104 and 105, and from chamber 103 into chamber 61 through valves 106 and 107. As long as the piston 45 has not blocked port 58, the air in chambers 103 and 61 will be forced into chamber 56 through port 58 thereby scavenging chamber 56. After the piston 45 blocks port 58, the piston 46 continues to force the air in chamber 62 into chamber 103 and also partially into chamber 61. However, as the piston assembly 44 continues to move to the left, the volume of chamber 103 increases at a rate related to the rate at which the volume of chamber 62 decreases. Thus, the pressure against which the piston 46 is required to work is not as great as in engine 21 and as a result, the piston 46 is forced to do less work during its leftward movement in engine 98.

Another advantage of engine 98 is that if oil leaks past piston 45, the wall 99 prevents the oil from leaking into the bore 29, thereby reducing the chances of contaminating the air in compressor chamber 68.

FIG. 6

The engine 108 is similar to the engine 21, in structure and mode of operation, except that it includes still another arrangement for scavenging the combustion chamber 56. As in engine 98, the engine 108 includes a wall 109 that prevents communication between the bores 28 and 29. Wall 109 is identical to wall 99 except that the former does not have any one-way valves mounted therein. Rather, the housing 25 includes one-way valves, shown schematically at 111 and 112, which permit atmospheric air to be drawn directly into chamber 103. One-way valves, shown schematically at 113 and 114, permit the air in chamber 103 to flow from that chamber into chamber 61. Moreover, the one-way valve 63 in housing 26 has been replaced by a check valve, shown schematically at 115, which permits leakage air to escape from chamber 62 but does not permit atmospheric air to be drawn into chamber 62. Moreover, check valve 115 may also be positioned in wall 109 to operate in a similar fashion.

During operation of the engine 108, movement of the piston assembly 44 to the left causes any excess air to be expelled from chamber 62, through check valve 115, while at the same time piston 45 causes air to be drawn into chamber 103 through valves 111 and 112. During movement of piston assembly 44 to the right, the piston 45 forces the air in chamber 103 to flow into chamber 61 through valves 113 and 114 and the air in chamber 61 to scavenge the combustion chamber 56 in a still more efficiently phased relationship than that in engines 21 and 98. Likewise, as the piston 46 moves to the right, a partial vacuum or negative pressure is created in chamber 62, thereby causing chamber 62 to act as a negative bouncer chamber. The utilization of chamber 62 as a negative bouncer chamber, of course, retards the inward movement of the piston assemblies while assisting their outward movement.

The engine 108 may be modified by eliminating valves 113 and 114 so that there may be free communication between chambers 103 and 61 and port 58 or replacing them with unvalved piston operated ports or fluid diodes. In this case the chamber 61 and valves 113 and 114 are replaced by a passage directly interconnecting chambers 103 and 56. Furthermore, the engine 108 can be further modified by replacing valves 111 and 112 also with piston operated ports or fluid diodes. Moreover, as noted, valve 115 may also be positioned in wall 109, if desired, and when so positioned, would operate in the same manner as described above. In addition, the chamber 62 of engine 108 may also be used as a positive bouncer chamber. When this is the case, check valve 115 is arranged to permit air to be drawn into the chamber 62 to replenish the air in that chamber which generally would leak past piston 46 into chamber 68.

BOUNCER CHAMBER—FIG. 7

Engine 116 may be identical to engine 21, both in structure and mode of operation, except that engine 116 has a bouncer chamber formed between the piston 52 and the synchronizer mechanism 76. More specifically, a wall 117 is clamped between the end flanges 35 and 36 and extends across the right end of the bore 29 so that the bore 29 is isolated from the interior of the synchronizer housing 27. The wall 117 includes a central aperture 118 through which the shaft 74 projects. A conventional sealing ring 119 is carried by the wall 117 adjacent the aperture 118 so as to prevent leakage of air between the wall 117 and the shaft 74 during relative movement therebetween.

Instead of the extensions 95, the wall members 92 and 93 are connected with the outer face 94 of the piston 52 by a plurality of relatively thin arms 120 which are spaced from the central longitudinal axis of the shaft 74. Sealed apertures, not shown, are formed in the wall 117 through which the arms 120 project.

The wall 117 and the outer face 94 of the piston 52, together with the bore 29, define a bouncer chamber 121. A check valve, shown schematically at 122, is mounted in the housing 26 and permits air to be expelled from chamber 121. Thus, the chamber 121 functions as a negative bouncer chamber. However, if valve 122 were changed so that it would permit air to be drawn into chamber 121, then, of course, chamber 121 would function as a positive bouncer chamber.

Another advantage of engine 116 is that the wall 117 isolates the bore 29 from the synchronizer mechanism 76 thereby preventing synchronizer lubricant from leaking into the bore 29, thereby minimizing the chances of contaminating the air in the compressor chamber 68.

ALTERNATE COMPRESSOR CHAMBER
ARRANGEMENTS—FIG. 8

Figure 8:
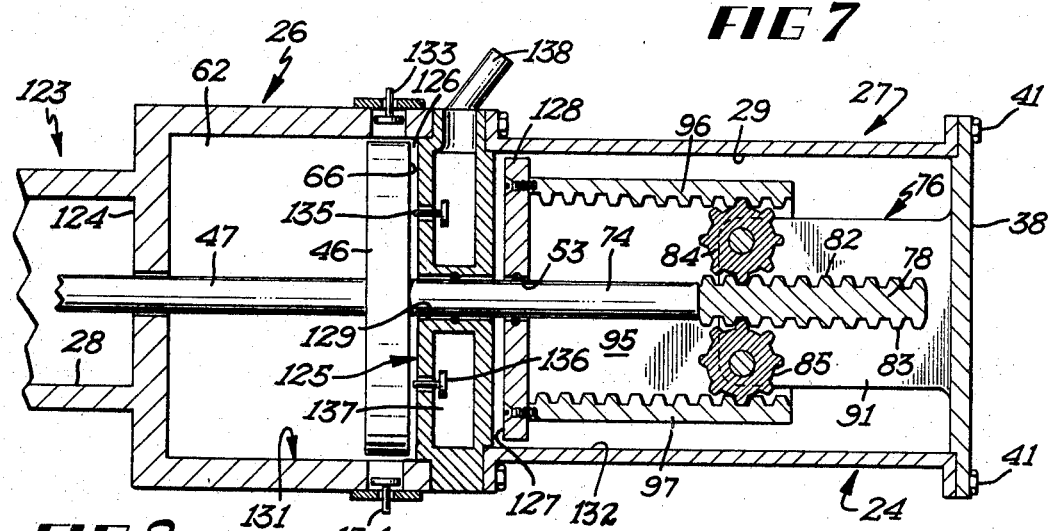
FIG. 8 is a schematic, cross-sectional view of the compressor section of a still further embodiment of the engine of the present invention, taken along the central longitudinal axis of the engine, wherein chamber means is positioned between an opposed piston assembly and a counter-balancing movable weight.
Figure 9:
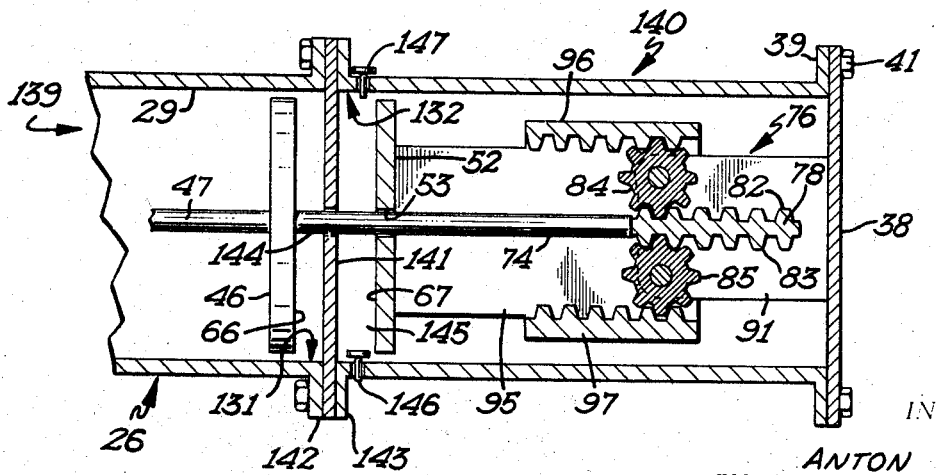
FIG. 9 is a schematic, cross-sectional view of the compressor section of a still further embodiment of the engine of the present invention, taken along the central longitudinal axis of the engine, which embodiment is similar to that shown in FIG. 8 except that wall means, rather than chamber means, is positioned between the opposed assemblies.
Figure 13:
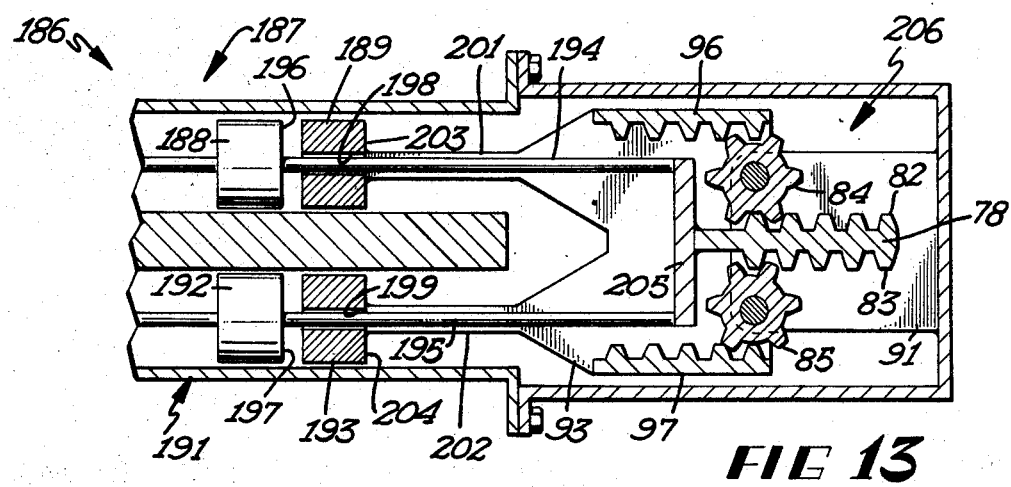
FIG. 13 is a schematic, cross-sectional view of the compressor section and synchronizer of another embodiment of the engine of the present invention, which engine includes a plurality of engine cylinders and a synchronizer generally similar to that shown in FIG. 1.

The engine 123, as shown schematically in FIG. 8 may be generally similar to the engine 21, both in structure and in mode of operation; however, the engine 123 includes an alternative compressor chamber arrangement which permits high volumetric efficiencies to be achieved by the compressor component of the engine.

The engine 123 also includes a wall 124 which is similar to the walls 99 and 109 of engines 98 and 108, respectively, in that the wall 124 prevents communication between the bores 28 and 29. As in engines 98 and 108, the advantage of the wall 124 is that it prevents oil from the combustion component 22 from leaking into the bore 29 and thereby reducing the chances of contaminating the fluid being compressed in compressor section 23. Furthermore, with the wall 124, the chamber 62 between the pistom 46 and the wall 124 may be utilized as a bouncer chamber or, if desired, as a scavenger-pump chamber for the combustion section 22.

In engine 123, a hollow annular member 125 is positioned in the space 126 formed in bore 29 between the inner faces 66 and 127 of the pistons 46 and 128. The piston 128 may be similar in structure to piston 52, although it may have a different construction since it functions as a bouncer piston. Moreover, if desired, the piston 128 need not function as a bouncer piston or for that matter, as a piston at all, but can simply function as a counter-balancing weight and, as such, it can, of course, have various constructions.

The hollow member 125 has a central aperture 129, including a sealing ring, not shown, formed therein through which the shaft 74 may slidably project. However, the central aperture 129 does not communicate with the interior of the member 125.

The member 125 divides the bore 29 into a left portion 131 and a right portion 132 and prevents communication between these portions. Conventional one-way valves, two of which are shown schematically at 133 and 134, are mounted in the housing 26 adjacent the member 125 and permit atmospheric air, or any other fluid to be compressed, to be drawn into the portion 131 of the bore 29 when the piston 46 is moving to the left in bore 29, i.e., away from member 125. Conventional one-way valves, two of which are shown schematically at 135 and 136, are mounted in the member 125 adjacent the inner face 66 of the piston 46 and permit compressed air or fluid to be forced into the interior chamber 137 of the member 125 when the piston 128 moves to the right in bore 29, i.e., toward the member 125. The interior chamber 137 of the member 125 communicates with a manifold 138 which directs the compressed air, or fluid, therein away from the engine 123. Thus, in engine 123, the air or fluid is compressed solely by the action of the piston 46, and the piston 128, together with the portion 132 of the bore 29, may either function as a bouncer chamber or the piston 128 may merely function as a movable weight for the purposes of achieving vibrationless operation of the engine. It also should be noted that if desired, the valves 133, 134, 135 and 136 could also be positioned in portion 132 so that this portion, rather than portion 131, would function as the compression chamber.

As noted above, one of the primary advantages of the engine 123 is that the use of member 125 permits the volumetric efficiency of the compressor component of the engine to be significantly increased. This is because the engine may be designed to have an extremely small clearance volume as there is a minimal incidental overstroke of the piston 46 because the return energy, i.e., the energy required to drive piston 45 to the left for the next combustion in chamber 56 may be supplied by the piston 128 functioning as a bouncer piston. By the use of member 125 and the use of piston 128 as a bouncer piston, the size of the compressor clearance volume may be independently varied without affecting the other thermodynamic characteristics of the engine.

Also, as would be expected, the smaller clearance volume and concomitant higher volumetric efficiency of the engine 123 increases valve-opening time and thus the life of the valves utilized in the compressor component of the engine 123. Furthermore, since the valves 135 and 136 are not mounted about the circumference of housing 26, the area available for mounting the valves 133 and 134 and the valves 135 and 136 is optimized. Moreover, this arrangement of the valves 133, 134, 135 and 136 results in less power required for same air-output.

FIG. 9

The engine 139 is similar to the engine 21, both in structure and mode of operation, except that the engine 139 includes another alternate clearance volume arrangement. In engine 139, a wall 141 is clamped between flanged portions 142 and 143 formed in a housing 140 and this wall 141, like member 125 in engine 124, divides the bore 29 into two separate portions 131 and 132. The wall 141 has a central aperture 144 through which the shaft 74 may slidably project.

The wall 141 and the inner face 67 of the piston 52 define a compressor chamber 145. Conventional one-way valves, one of which being shown schematically at 146, are positioned in the housing 27 adjacent the flange 143 and permit atmospheric air or other fluids to be compressed to be drawn into the compressor chamber 145 while the piston 52 is moving to the right, i.e., away from the wall 141. Other conventional one-way valves, one of which being shown schematically at 147 are positioned in the housing 140 adjacent the flange 143 and permit compressed air or fluid to be discharged from the compressor chamber 145 during the time the piston 52 is moving to the left, i.e., toward the wall 141. Unlike in engine 124, compression of air or fluid, is accomplished entirely by the piston 52 and the piston 46 and the portion 131 of the bore 29 merely function as a bouncer chamber.

The compressor chamber arrangement shown in engine 139 is simpler, from a structural standpoint, than the corresponding compressor chamber arrangement in engine 123, and thus is less expensive to manufacture. Moreover, it should be noted that the portion 131 can be used as the compressor chamber by placing the valves 146 and 147 on the left side of wall 141, and in such a case, the piston 52, of course, could function as a bouncer piston or would not have to function as a piston at all, but merely could be used to balance the engine.

ALTERNATIVE SYNCHRONIZER MECHANISMS—
FIG. 10

Engine 148 may be identical to the engine 21, both in structure and mode of operation, except that the synchronizer mechanism 76 in engine 21 has been replaced by a linkage mechanism 149. While synchronizer mechanism 76 and linkage mechanism 149 both basically perform the same function with respect to the engine, that is, transmit the instantaneous differential forces acting on the piston assemblies 44 and 51 from one assembly to the other, the linkage mechanism 149 differs structurally from the mechanism 76.

More specifically, the linkage mechanism 149 includes three sets of links: 151 and 152; 153 and 154; and 155 and 156. A pair of plates, one of which is shown at 157, are spaced equidistant from the central longitudinal axis of the shaft 74 and are attached at one end to the outer face 94 of the piston 52. A pair of pins 158 and 159 extend between the other ends of these plates at two points spaced equidistant from the central longitudinal axis of the shaft 74. These pins 158 and 159 pivotally interconnect the plates to one end of the links 155 and 156. The other ends of the links 155 and 156 are pivotally connected to one end of the links 153 and 154, respectively. The other ends of the links 153 and 154 are pivotally connected to one end of the links 151 and 152, respectively. The other ends of the links 151 and 152 are pivotally connected to the bifurcated end 161 of the shaft 74 by means of a pin 162. Arms 163 and 164 are attached, at one end, to cover plate 38 and extend to the left from plate 38 in a direction parallel to but spaced equidistant from the central longitudinal axis of the shaft 74. The links 153 and 154 are pivotally connected at points 165 and 166 to the other end of the arms 163 and 164, respectively.

As noted above, the linkage mechanism 149 synchronizes the movement of the piston assemblies 44 and 51. The advantage of linkage mechanism 149, compared to synchronizer mechanism 76, is that the mechanism 149 is relatively inexpensive to manufacture.

FIGS. 11 AND 12

Engine 167 may be identical to the engine 21, both in structure and mode of operation, except that the engine 167 utilizes a hydraulic synchronizer 168, rather than synchronizer mechanism 76. The hydraulic synchronizer 168 performs basically the same function, with regard to the engine, as does synchronizer mechanism 76.

Hydraulic synchronizer 168 comprises a generally rectangular reservoir body 169. The body 169 has a circular flange 171 formed at one end thereof which is used to attach the body 169 to the flanged end 36 of the housing 26. The body 169 has a central bore 172 and two smaller bores 173 and 174 drilled therein. The central longitudinal axis of the bore 172 is coaxial with the central longitudinal axis of the shaft 74 and the central longitudinal axes of the bores 173 and 174 are parallel to but spaced equidistant from the central longitudinal axis of the bore 172. The diameters of the bores 172, 173 and 174 may be selected so that the cross-sectional area of the bore 172 is equal to the sum of the cross-sectional areas of the bores 173 and 174.

A pair of ports 175 and 176 permit fluid communication between the bores 172 and 173 and between the bores 172 and 174, respectively.

The end 177 of the shaft 74 includes a plunger 178 which is of a diameter to fit snugly in the bore 172. A pair of shafts 179 and 181 are attached, at one end, to the outer face 94 of the piston 52 and are arranged so that their other ends 182 and 183 project within the bores 173 and 174, respectively. Plungers 184 and 185 are carried by the ends 182 and 183 and are of such a diameter as to fit snugly within the bores 173 and 174.

During the operation of the engine the bores 172, 173 and 174, to the right of the plungers 178, 184 and 185, are filled with hydraulic fluid so that movement of the plunger 178 in one direction causes a corresponding movement in the opposite direction of the plungers 184 and 185 and vice versa.

MULTIENGINE ARRANGEMENTS—FIG. 13

As noted above, the principles of this invention are applicable to engines having a plurality of engine cylinders. One example of such an application is engine 186 which includes a first engine cylinder 187 having axially opposed pistons 188 and 189 positioned therein for reciprocal movement. A second engine cylinder 191 is positioned adjacent to engine cylinder 187 so that the central longitudinal axes of the engine cylinders 187 and 191 are substantially parallel. The engine cylinder 191 also has a pair of axially opposed pistons 192 and 193 positioned therein for reciprocal movement. The pistons 188 and 192 may be identical to piston assembly 44 in engine 21 and the pistons 189 and 193 may be identical to piston assembly 51 in engine 21.

A pair of shafts 194 and 195 are fastened at one end to the inner faces 196 and 197, respectively, of the pistons 188 and 192 and slidably project through central apertures 198 and 199 formed in the pistons 189 and 193, respectively. Each of the pistons 189 and 193 has a pair of extensions, one of each pair being shown at 201 and 202, attached to its outer face 203 and 204 thereof. In structure and in mode of operation, each of the engine cyclinders 187 and 191 may be identical to the engine 21 shown in FIG. 1.

A transverse bar 205 is fastened to and carried by the other ends of the shafts 194 and 195. The bar 205, in turn, carries the double-rack block 78 of the synchronizer mechanism 206 which may be identical in structure and mode of operation to the synchronizer mechanism 76, utilized in the engine 21, with the only difference being that the component parts of the mechanism 206 are of larger dimension than the corresponding parts in mechanism 76. The extensions 201 and 202 are part of wall member 93 and are fastened to and carry the racks 96 and 97 of the mechanism 206 so that the teeth of these racks engage the teeth of the pinions 84 and 85. The teeth of the pinions 84 and 85 engage the teeth of the racks 82 and 83 formed on the block 78. As noted above, the synchronizer mechanism 206 functions in the same manner as the mechanism 76 so that movement of the pistons 188 and 192 in one direction causes corresponding movement of the pistons 189 and 193 in the opposite direction.

FIGS. 14–15

Engine 207 is similar in structure and mode of operation to engine 186 except that no part of the force transmitting means which interconnects the pistons 208 and 209 with the synchronizer mechanism 211 penetrates or projects through the axially opposed pistons 212 and 213. Moreover, the pistons 208 and 209 are not similar to the piston assemblies 44 in engine 21 but rather are both interconnected to a single, larger diameter piston 214, as hereinafter described.

More specifically, the engine 207 includes first and second power cylinders 215 and 216 which shape a common connecting member 217. Axially opposed pistons 208 and 212 are positioned in power cylinder 215 for reciprocal movement therein and define a combustion chamber 218 therebetween. Likewise, axially opposed pistons 209 and 213 are positioned within power cylinder 216 for reciprocal movement therein and define a combustion chamber 219 therebetween. Shafts 221 and 222 are fastened at one end, to the outer faces 223 and 224 of the pistons 208 and 209, extend to the left from pistons 208 and 209 and are fastened at their other ends to a yoke 225 which extends from the longitudinal central axis of the power cylinder 215, to the longitudinal central axis of the power cylinder 216.

A shaft 226 is attached at one end to the center of the yoke 225 and projects through a bore 227 formed in the connecting member 217. The other end of the shaft 226 is fastened to and carries the double-rack block 78 which is a component of the synchronizer mechanism 211. The synchronizer mechanism 211 may be identical, both in structure and mode of operation, to the synchronizer mechanism 206 of engine 186. The racks 96 and 97 of the mechanism 211 are connected to and carried by the pistons 212 and 213 by means of wall members one of which is shown at 93 and two pairs of extensions, one of each pair being shown at 228 and 229.

Figure 14:
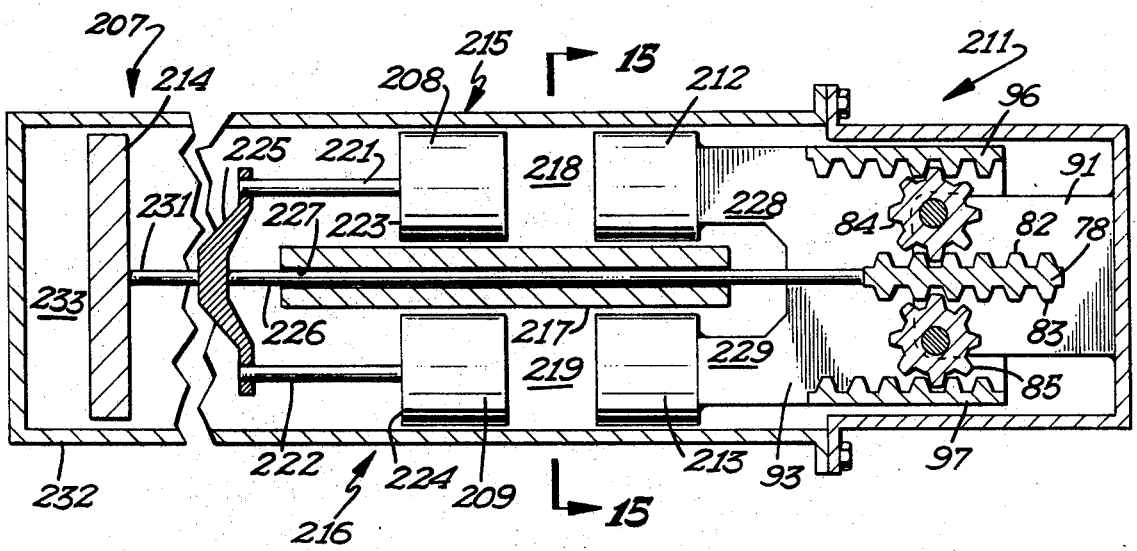
FIG. 14 is a schematic, cross-sectional view of still another embodiment of the engine of the present invention, which engine includes a plurality of power cylinders and a synchronizer generally similar to that shown in FIG. 1.
Figure 15:
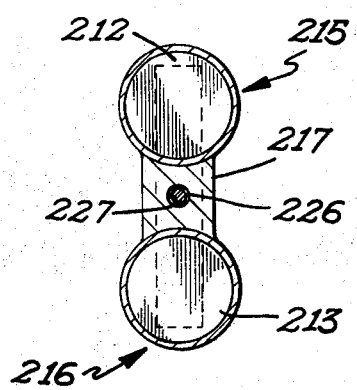
FIG. 15 is a vertical cross-sectional view of the engine taken along section line 15—15 in FIG. 14.

Another shaft 231 connects the yoke 225 with the piston 214 and this shaft is axially aligned with shaft 226. As shown in FIG. 14, the piston 214 is positioned for reciprocal movement in a cylindrical housing 232, with the piston 214 and the housing 232 defining a compressor chamber 233 therebetween. The mode of operation of engine 207 may be basically similar to that of engine 186 and engine 21. However, as noted, engine 207 is particularly adapted to permit chamber 218 and 219 to serve as combustion chambers while utilizing the piston 214 and the housing 232 as the compression component of the engine.

Furthermore, it should be noted that in engine 186 and particularly, in engine 207, the engine may comprise more than two power cylinders. Thus, in engine 207, as long as the central longitudinal axes of the power cylinders are all equidistant from the central longitudinal axis of the shaft 226, the only substantial limitation as to the number of power cylinders that may be utilized in the engine 207 is the peripheral space available. The advantage of using multiple power cylinders, particularly when the piston 214 and cylinder housing 232 are utilized as the compressor component of the engine, is that the size of the power cylinders may be correspondingly reduced to reduce the thermal loading of the combustion sections.

CONCLUSION

In view of the foregoing, it is apparent that the invention described herein provides a significant breakthrough in the free piston engine field in that this invention permits free piston engines to achieve the advantages which they have always theoretically had over conventional crank type internal combustion engines of the same class and piston speed. Thus, the utilization of the principles of this invention permit, in contrast to prior engines, considerable freedom in designing free piston engines since the synchronizer and the principal sections of the engine can be designed substantially independently of each other thereby permitting, for any given engine, an optimum design for the engine sections and the synchronizer to be achieved. Because it is believed that the principles of this invention have broad applications, the term "engine" has been used herein in a generic sense so as to include all types of free piston engines, such as free piston compressors and free piston gasifiers.

Of course, it will be apparent to those skilled in the art that the features of the various engines disclosed herein may be used interchangeably and in combination. It should also be obvious that still further modifications of the engines disclosed herein are possible. For example, in larger engines, the synchronizer structure may be substantially positioned within and carried by the penetrated piston assembly, that is, the piston assembly corresponding to piston assembly 51 in engine 21. Further, the penetrated piston assembly may have only limited movement within the engine cylinder and in fact, may not, strictly speaking, actually function as a piston.

Thus, since the invention disclosed herein may be embodied in other specific forms without departing from the spirit or central characteristics thereof, the preferred embodiments described herein are therefore to be considered in all respects as illustrative and not restrictive, the scope of the invention being indicated by the appended claims, rather than by the foregoing description, and all changes which come within the meaning and range of equivalency of the claims are therefore intended to be embraced therein.

I claim:

1. An improved free piston engine comprising: housing means having a power cylinder and a compressor cylinder formed therein, said power and compressor cylinders being coaxial and having adjacent inner ends; a power piston positioned in said power cylinder for reciprocal movement therein parallel to the longitudinal axis of said power cylinder and having inner and outer faces formed thereon; said power cylinder defining an internal combustion chamber between the outer face of the power piston and the closed outer end of said power cylinder; first and second pistons positioned in said compressor cylinder for reciprocal movement therein parallel to the longitudinal axis of said compressor cylinder, the first and second pistons each having an inner and outer face formed thereon and being positioned in said compressor cylinder so that their inner faces are adjacent to each other, the other face of the first piston is adjacent to inner end of said compressor cylinder and the outer face of the second piston is adjacent to the outer end of said compressor cylinder; means extending between the inner face of the power piston and the outer face of the first piston for interconnecting the power piston and first piston whereby the engine piston and the first piston move together as a piston unit; said compressor cylinder defining a compression chamber between the inner faces of the first and second pistons; valve means carried by the housing means adjacent said compressor chamber to permit the ingress of fluid to be compressed into said compressor chamber and the egress of compressed fluid from said compression chamber; said compressor cylinder defining a first chamber between the outer face of the first piston and the inner end of said compressor cylinder, and also defining a second chamber between the outer face of the second piston and the outer end of said compressor cylinder; synchronizer means for transmitting substantially all the instantaneous, differential forces acting on the piston unit and the second piston from the piston unit to the second piston and from the second piston to the piston unit, and for causing movement of the piston unit and the second piston in opposite directions in said cylinders, said synchronizer means including: first motion transmitting means connected at one end with the inner face of the first piston and having its other end projecting through the inner face of the second piston, second motion transmitting means connected at one end with the second piston, and means carried by the housing means and positioned towards the outer end of said compressor cylinder and beyond the inner face of the second piston for interconnecting the other end of the first motion transmitting means and the other end of the second motion transmitting means.

2. The engine described in claim 1 wherein the connecting means of the synchronizer means is positioned beyond the outer face of the second piston.

3. The engine described in claim 1 wherein wall means is positioned in said compressor cylinder between the inner faces of the first and second pistons, said wall means and the first piston defining a third chamber in said compressor cylinder and said wall means and the second piston defining a fourth chamber in said compressor cylinder; and wherein the valve means permits the ingress and egress of fluid into and from one of the third and fourth chambers.

4. The engine described in claim 1 wherein a scavenge air chamber is formed in the housing means adjacent the inner ends of said power and compressor cylinders, first passage means connecting the scavenge air chamber with said combustion chamber, first means for controlling flow through the first passage means in response to the movement of the engine piston; second passage means connecting the scavenge air chamber with a source of air; second means for controlling the flow through said second passage means whereby the pressure of the scavenge air in the scavenge air chamber always remains at such a level as to cause exhaust of the combustion gases and supply of a fresh charge into said combustion chamber during the time flow is permitted through the first passage means.

5. The engine described in claim 1 wherein said first and second chambers function as bouncer chambers.

6. The engine described in claim 1 wherein the first and second motion transmitting means are spaced from each other in a direction perpendicular to the central longitudinal axis of said compressor cylinder and said connecting means of the synchronizer means is positioned substantially between the first and second motion transmitting means.

7. The engine described in claim 2 wherein a wall means is formed in said compressor cylinder between the outer face of the second piston and the outer end of said compressor cylinder whereby said second chamber is defined in said compressor cylinder between the wall means and the outer face of the second piston; and wherein said second chamber functions as a bouncer chamber.

8. The engine described in claim 3 wherein the valve means permits the ingress and egress of fluid into and from the third chamber.

9. The engine described in claim 4 wherein the engine piston controls the flow through the first passage means.

10. The engine described in claim 4 wherein said source of air includes said first chamber; and wherein said second controlling means includes one-way valving means mounted in the housing means for permitting the ingress of air into said first chamber.

11. The engine described in claim 4 wherein a wall means is formed between the inner ends of said power and compressor cylinders; wherein the second passage means includes a passage which connects the scavenge air chamber with the space in said power cylinder between the inner face of the power piston and the wall means for at least a part of the stroke of the engine piston; and wherein said first chamber is formed in said compressor cylinder between the wall means and the outer face of the first piston.

12. The engine described in claim 6 wherein the first and second motion transmitting means each includes rack means and the connecting means includes rotatable gear means positioned so that the teeth thereof engage the teeth of the rack means.

13. The engine described in claim 6 wherein the first motion transmitting means of the synchronizer means includes a shaft having its central longitudinal axis coaxial with the central longitudinal axis of said compressor cylinder and includes first and second racks mounted on the end thereof, remote from the inner face of the first piston, the first and second racks being arranged so that the teeth thereof project outwardly with respect to the central longitudinal axis of the shaft; wherein the second motion transmitting means includes third and fourth racks and frame means for supporting the third and fourth racks adjacent to and parallel with the first and second racks of the first motion transmitting means, respectively, so that the teeth of the third and fourth racks project inwardly with respect to the central longitudinal axis of the shaft; wherein the connecting means includes first and second gear means, with the first gear means being supported for rotation between the first and third racks so that the teeth of the first gear means engages the teeth of both of these racks and with the second gear means being supported for rotation between the second and fourth racks so that the teeth of the second gear means engages the teeth of both of these racks; and wherein the frame means balances the normal components of the forces created by the transmission of forces between the teeth of the third and fourth racks and the teeth of the first and second gear means.

14. The engine described in claim 8 wherein the fourth chamber functions as a bouncer chamber.

15. The engine described in claim 11 wherein said first chamber functions as a bouncer chamber; and wherein the passage includes valving means.

16. An improved free piston engine comprising: housing means including at least two substantially identical cylinder assemblies which are arranged so that the central longitudinal axes of the cylinder assemblies are substantially parallel, each of the cylinder assemblies comprising: cylinder means and a first and a second piston assembly which are positioned in said cylinder means for reciprocal movement therein, the first and second piston assemblies each having inner and outer faces formed thereon and being positioned in said cylinder means so that the inner faces of the piston assemblies are adjacent and the outer faces thereof are adjacent the ends of said cylinder means, a first chamber defined in said cylinder means between the inner faces of the piston assemblies and a second chamber means defined in the housing means between the outer face of one of the piston assemblies and an end of the housing means, with one of said first chamber and second chamber means being an internal combustion chamber and the other being a compressor chamber; and synchronizer means positioned in the housing means adjacent an end of the cylinder assemblies, the synchronizer means comprising: first motion transmitting means connected with the first piston assemblies in each of the cylinder assemblies; and means connecting the first motion transmitting means with the second motion transmitting means whereby the instantaneous differential forces acting on the first piston assemblies and the second piston assemblies are transmitted from one of the interconnected piston assemblies to the other, and whereby in each cylinder assembly, the first piston assembly and the second piston assembly move in opposite directions, while the first piston assemblies in all the cylinder assemblies move in the same direction.

17. The engine described in claim 16 wherein said second chamber means includes chambers defined in the cylinder assemblies between the outer face of one of the piston assemblies and one end of the cylinder means.

18. The engine described in claim 16 wherein portions of the first motion transmitting means projects through the inner and outer faces of the second piston assemblies.

19. The engine described in claim 16 wherein the first motion transmitting means includes a shaft having at least two racks mounted thereon so that the teeth of the racks project outwardly with respect to the central longitudinal axis of the shaft; wherein the second motion transmitting means includes at least two racks supported so that each of the racks of the second motion transmitting means are adjacent to and parallel with one of the racks of the first motion transmitting means, with the teeth of the racks of the second motion transmitting means projecting inwardly with respect to the central longitudinal axis of the shaft; wherein the connecting means includes at least two gear means mounted for rotation on the housing means, with one of the gear means being supported for rotation bebetween the two racks of the second motion transmitting of the gear means engage the teeth of both racks of the adjacent pair of racks of the first and second motion transmitting means and wherein the synchronizer means also comprises frame means, including wall means interconnecting the two racks of the second motion transmitting means, for supporting the racks of the second motion transmitting means so that relative movement is prevented between the two racks of the second motion transmitting means and between the racks of the second motion transmitting means and the frame means and so that the frame means balances the normal components of the forces created by the transmission of forces between the teeth of the racks of the second motion transmitting means and the teeth of the gear means.

20. The engine described in claim 16 wherein a portion of the first motion transmitting means extends substantially between the cylinder assemblies and the central longitudinal axes of the cylinder assemblies are parallel to and spaced from the central longitudinal axis of said portion.

21. The engine described in claim 16 wherein said second chamber means includes a third cylinder means wherein a third piston assembly is positioned, for reciprocal movement, in the third cylinder means, and wherein means connects the third piston assembly with the first piston assemblies in all cylinder assemblies whereby the third piston assembly and all the first piston assemblies move together as a unit.

22. The engine described in claim 21, wherein a portion of the first motion transmitting means extends substantially between the cylinder assemblies and the central longitudinal axes of the cylinder assemblies are parallel to and spaced from the central longitudinal axes of said portion.

23. An improved synchronized, balanced, unsymmetrical free piston engine, comprising:
 (a) a housing means, including first and second ends, having coaxial power and compressor cylinder formed therein, the power cylinder having a cylinder head defining one end thereof;
 (b) a power piston, with first and second faces, positioned in the power cylinder for reciprocal movement therein parallel to the longitudinal axis of the power cylinder, a combustion chamber being formed in the power cylinder between the first face of the power piston and the cylinder head;
 (c) first and second compressor pistons, each having first and second faces, the first and second compressor pistons positioned in the compressor cylinder for reciprocal movement therein parallel to the longitudinal axis of the compressor cylinder;

(d) valve means, adjacent the compressor cylinder, for permitting the ingress of fluid into the compressor cylinder and the egress of compressed fluid from the compressor cylinder;

(e) first connection means for interconnecting two of the power piston, first compressor piston, and second compressor piston for causing the interconnected pistons to move together as a group, one of the power piston, first compressor piston, and second compressor piston remaining which is not associated with the piston group;

(f) second connection means connected with the piston group and movable therewith;

(g) third connection means connected with the remaining piston and movable therewith; and (h) synchronizing means, connected with the second connection means and the third connection means, for balancing the engine by transmitting substantially all the instantaneous differential forces acting upon the piston group and the remaining piston between the piston group and the remaining piston for causing movement of the piston group and the remaining piston in relatively opposite directions in the power and compressor cylinders in a manner that the product of the mass associated with the piston group moving in one direction in the engine multiplied by the length of the stroke of the piston group mass equals the product of the mass associated with the remaining piston moving in the opposite direction in the engine multiplied by the length of the corresponding stroke of the remaining piston mass.

24. The engine to claim 23, wherein the power cylinder is positioned adjacent the first end of the housing means, and wherein at least one piston of the first compressor piston, and second compressor piston is penetrated by a connection means.

25. The engine of claim 24, wherein the first connection means interconnects the power piston and one of the first compressor piston and second compressor piston for causing the power piston and the connected compressor piston to move together as a group.

26. The engine of claim 25, wherein the synchronizer is positioned adjacent the second end of the housing means, the second compressor piston is positioned between the synchronizer and the first end of the housing means, the first compressor piston is positioned between the second compressor piston and the first end of the housing means, and the power piston is positioned between the first compressor piston and the first end of the housing means and wherein the power piston and the first compressor piston are interconnected, the second compressor piston being penetrated by at least the second connection means.

27. The engine of claim 26, further comprising a wall positioned between the synchronizer and the second compressor piston for isolating the synchronizer from the compressor cylinder, a bouncer chamber being formed between a face of the compressor piston and the wall.

28. The engine of claim 26, further comprising a wall positioned between the first compressor piston and the second compressor piston, a first chamber being formed in the compressor cylinder between the first compressor piston and the wall and a second chamber being formed in the compressor cylinder between the wall and the second compressor piston.

29. The engine of claim 28, wherein one of the first chamber and second chamber functions as a positive bouncer chamber.

30. The engine of claim 23, comprising: a first compressor chamber adjacent a face of one of the first and second compressor pistons, with gas in the first compressor chamber being compressed during the power stroke of the power piston to provide a compressed gas output from the engine; a second compressor chamber adjacent a face of a piston within the engine, with gas in the second compressor chamber being compressed during the power stroke of the power piston independently of the first compressor chamber and with the second compressor chamber functioning as a bouncer chamber; and a third compressor chamber adjacent a face of a piston within the engine, with gas in the third compressor chamber being compressed during the power stroke of the power piston independently of the first compressor chamber and the second compressor chamber and with the third compressor chamber functioning as a scavenge chamber.

31. A balanced free piston engine, comprising: An engine housing defining a power cylinder means therein; power piston means mounted in the power cylinder means for reciprocal movement therein in directions substantially parallel to the central longitudinal axis of the power cylinder means and defining an internal combustion chamber with the power cylinder means; an energy absorbing device having a reciprocally movable member; connecting means connected to the power piston and connected to the movable member of the energy absorbing device, the connecting means, the power piston means, and the movable member of the energy absorbing device together defining a power assembly wherein all components of the power assembly always move together as a unit with respect to the housing of the engine; means for returning the power piston to its top-dead-center position in the power cylinder; a balancing and synchronizing assembly having a first portion connected to move with the power assembly and having a second portion arranged for translation movement with respect to the engine housing in a direction opposite to the direction of movement of the power assembly in response to movement of the power assembly; and counter-balancing means, connected to move with the second portion of the balancing and synchronizing assembly, having a pre-selected weight for balancing the engine by moving through a stroke of such length that the absolute product of the sum of the weight associated to move with the counter-balancing means multiplied by the stroke of the counter-balancing means is substantially equal to the absolute product of the weight associated to move with the power assembly multiplied by the corresponding stroke of the power assembly.

32. The balanced free piston engine of claim 31 wherein the energy absorbing device is a gas compressor comprising: a compressor housing having a compressor cylinder therein, a first compressor piston arranged to reciprocate within the compressor cylinder, with the compressor piston defining at least one compressor chamber in the compressor cylinder, compressor inlet and outlet valve means mounted in the compressor housing for permitting the ingress and egress of gas into and from the compressor chamber; wherein the power cylinder means is positioned in the housing adjacent one end thereof; wherein the compressor cylinder is positioned in the housing adjacent to the power cylinder means; wherein at least a portion of the connecting means comprises first shaft means connecting the power piston means and the first compressor piston such that the power piston means and the first compressor piston reciprocate together in their respective cylinders; wherein the counter-balancing means includes a second compressor piston which is also arranged to reciprocate within the compressor cylinder; wherein the balancing and synchronizing assembly is positioned in the housing adjacent the other end of the engine; wherein the second compressor piston is positioned adjacent to the balancing and synchronizing assembly; and wherein second shaft means interconnects the first compressor piston with the balancing of the synchronizing assembly, the second shaft means extending through a sealed aperture formed in the second compressor piston.

33. The balanced free piston engine of claim 31, wherein the counter-balancing means forms at least a portion of the second portion of the balancing and synchronizing means.

34. The balanced free piston engine of claim 33, wherein the counter-balancing means of the balancing and synchronizing assembly comprises a counter-balancing movable weight.

35. The balanced free piston engine of claim 34, wherein the energy absorbing device is a compressor comprising a compressor housing defining a compressor cylinder therein, and having a movable compressor piston, with the compressor piston being arranged to reciprocate within the compressor cylinder and defining at least one compressor chamber in the compressor cylinder.

36. The balanced free piston engine of claim 35 wherein the compressor includes compressor inlet and outlet valve means mounted in the compressor housing for permitting the ingress and egress of gas into and from the compressor chamber.

37. The balanced free piston engine of claim 36, wherein the power cylinder means is positioned in the housing adjacent one end of the engine; wherein the compressor cylinder is positioned in the housing between the power cylinder means and the other end of the engine; and wherein the connecting means interconnects the power piston and the compressor piston to reciprocate together in their respective cylinders.

References Cited

UNITED STATES PATENTS

| | | | |
|---|---|---|---|
| 947,908 | 2/1910 | Heglar | 74—29 |
| 1,640,655 | 8/1927 | Hartman et al. | 74—110 |
| 2,027,877 | 1/1936 | Pescara | 230—56 |
| 2,084,822 | 2/1941 | Pescara | 60—19 |
| 2,244,215 | 6/1941 | Pescara | 74—110 |
| 2,398,221 | 4/1946 | Gerharot | 123—46 |
| 2,442,470 | 6/1948 | Pescara | 123—46 |
| 2,772,574 | 12/1956 | Thomas | 74—110 |
| 2,991,773 | 7/1961 | Cadious | 123—46 |
| 3,170,406 | 2/1965 | Robertson | 103—54 |
| 3,188,805 | 6/1965 | Gahagan | 60—35.6 |
| 3,318,089 | 5/1967 | Beukering et al. | 60—24 |

FOREIGN PATENTS 73,018  4/1960  France.
(Addition to No. 1,128,251)

WENDELL E. BURNS, Primary Examiner

U.S. Cl. X.R.

74—110; 92—84; 123—46; 417—488